United States Patent
Hahn et al.

(10) Patent No.: US 8,281,062 B2
(45) Date of Patent: Oct. 2, 2012

(54) PORTABLE STORAGE DEVICE SUPPORTING FILE SEGMENTATION AND MULTIPLE TRANSFER RATES

(75) Inventors: Judah Gamliel Hahn, Ofra (IL); Donald Ray Bryant-Rich, Haifa (IL)

(73) Assignee: Sandisk IL Ltd., Kfar Saba (IL)

( * ) Notice: Subject to any disclaimer, the term of this patent is extended or adjusted under 35 U.S.C. 154(b) by 1038 days.

(21) Appl. No.: 12/199,023

(22) Filed: Aug. 27, 2008

(65) Prior Publication Data
US 2010/0057992 A1 Mar. 4, 2010

(51) Int. Cl.
*G06F 13/00* (2006.01)
(52) U.S. Cl. ............ 711/103; 711/5; 711/115; 711/150; 711/173; 710/13; 710/74; 710/305; 710/315
(58) Field of Classification Search ............ 711/5, 103, 711/115, 150, 173; 710/13, 74, 305, 315
See application file for complete search history.

(56) References Cited

U.S. PATENT DOCUMENTS

| | | | |
|---|---|---|---|
| 6,292,863 B1 | 9/2001 | Terasaki et al. | |
| 6,890,188 B1 * | 5/2005 | Le | 439/76.1 |
| 7,762,470 B2 * | 7/2010 | Finn et al. | 235/492 |
| 7,953,930 B2 * | 5/2011 | Cheng | 711/115 |
| 2006/0112197 A1 * | 5/2006 | Yao | 710/15 |
| 2007/0055821 A1 * | 3/2007 | Ootsuka et al. | 711/115 |
| 2007/0294467 A1 | 12/2007 | Leung | |
| 2007/0294468 A1 | 12/2007 | Olbrich et al. | |
| 2008/0126682 A1 * | 5/2008 | Zhao et al. | 711/103 |
| 2008/0155160 A1 * | 6/2008 | McDaniel | 710/306 |
| 2008/0320214 A1 * | 12/2008 | Ma et al. | 711/103 |
| 2009/0083476 A1 * | 3/2009 | Pua et al. | 711/103 |
| 2009/0164686 A1 * | 6/2009 | Sprouse et al. | 710/302 |

FOREIGN PATENT DOCUMENTS
GB 2430508 A * 3/2007

OTHER PUBLICATIONS
International Search Report and Written Opinion for International Application No. PCT/US2009/050894, dated Sep. 4, 2009, 12 pages.

* cited by examiner

*Primary Examiner* — Hong Kim
(74) *Attorney, Agent, or Firm* — Toler Law Group, PC

(57) ABSTRACT

A storage device has two connectors for transferring data files: a first connector through which data files can be transferred at an accelerated speed, and a second connector through which data files can be transferred at a conventional speed. According to the present disclosure a user can select the speed (i.e., "normal speed" or "accelerated speed") at which s/he wants to transfer a data file from a host to the storage device, and vice versa, by connecting the host to the proper connector of the storage device. The first connector is internally connected to a plurality of controllers that facilitate data transfers at the accelerated speed, and the second connector is internally connected to a controller that facilitates data transfers at the normal speed.

11 Claims, 11 Drawing Sheets

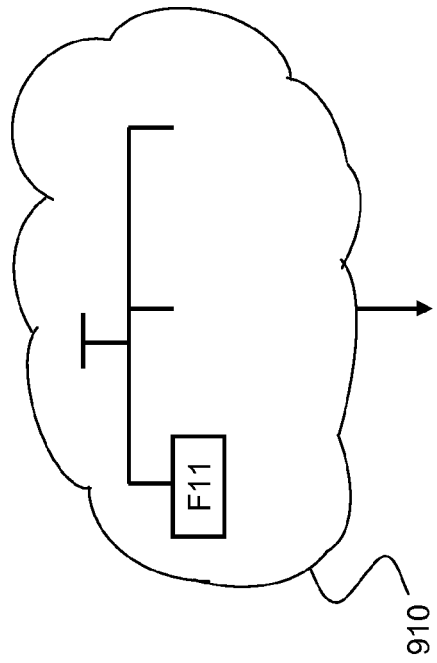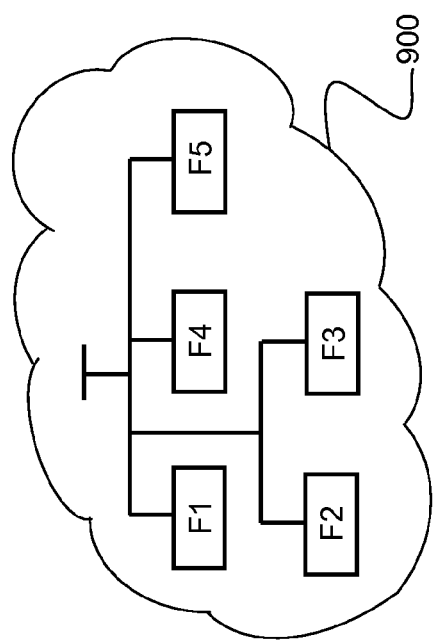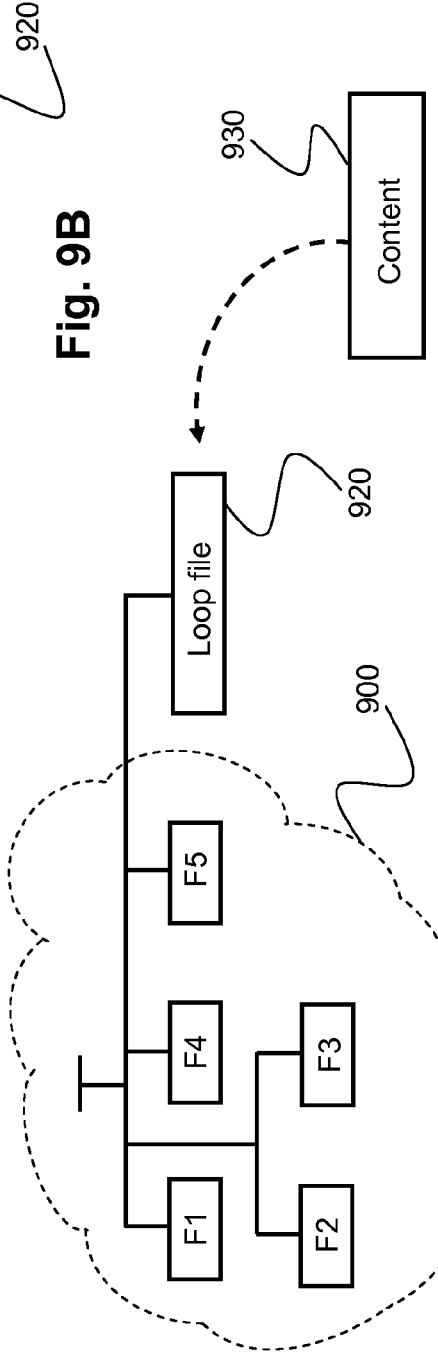

PORTABLE STORAGE DEVICE SUPPORTING FILE SEGMENTATION AND MULTIPLE TRANSFER RATES

FIELD OF THE INVENTION

The present invention generally relates to a portable storage device ("PSD") with increased read and write throughput and more specifically to a portable storage device that can selectively operate in one of two available modes of operations: "normal" mode and "rapid-access" mode.

BACKGROUND

Use of non-volatile based portable storage devices ("PSDs") for transferring data from one location to another has been rapidly increasing over the years because they are portable, and they have small physical size and large storage capacity. Storage devices come in a variety of designs. Some storage devices are regarded as "embedded", meaning that they cannot, and are not intended to, be removed by a user from a host device with which they operate. Other storage devices are removable, which means that the user can move them from one host device to another, or replace a storage device with another.

Other storage devices, which are commonly known as "Disk-on-Key" devices, are provided with a Universal Serial Bus ("USB") interface in order to allow them to be connected to a computer system, for example. A flash storage device that is provided with a USB interface is also known in the field as a USB Flash Drive, or "UFD". MultiMedia Card ("MMC"), Secure Digital ("SD"), miniSD, and microSD, are exemplary flash storage devices that are used with a variety of host devices such as multimedia players (e.g., MP3 and MP4 players), digital cameras, computer laptops, Global Positioning System ("GPS") devices, and so on.

One use case for PSDs involves the transfer of very large files, such as movies, for home entertainment consumption. "Very large files" are files whose size is, for example, 4 gigabytes ("GB") or greater. The speed of reading or writing very large files may be insufficient or annoying. For example, while the speed of reading data from a PSD is generally satisfactory for viewing movies, the relatively slow speed of writing such movies onto a PSD drive implies waiting several minutes (e.g. 3-4 minutes) for copying a 4 GB movie onto the PSD (using a typical write speed of 18 megabytes per second ("MB/s")), which is unsatisfactory for many users. Writing large files into a storage device takes a long time because of the way data is written into a flash memory; i.e., data is written in pages, one page after another, and voltages associated with the data writing are iteratively rechecked against predefined thresholds.

FIG. 1 shows a typical portable storage device ("PSD") 100. Portable storage device 100 includes a USB connector 110, a storage controller 120, and a storage area 130 that includes two separate flash memory units 140 and 150. Storage controller 120 manages transfer of data to/from storage area 130 while handling flash memory units 140 and 150 as a single, unified, storage area (i.e., storage area 130), where handling flash memory units 140 and 150 as a single, unified, storage area means that storage controller 120 addresses flash memory units 140 and 150 using a single file system. Each of flash memory units 140 and 150 can be a flash memory chip, a flash memory die, or a flash memory package. USB connector 110 has a typical electrical pin layout as illustrated in FIG. 2.

Referring to FIG. 2, it schematically illustrates a 4-pin layout usable by standard USB connectors. Pins 1 and 4 provide electrical energy from a connected host (not shown in FIG. 2) for energizing PSD 100. Pins 2 and 3 transfer electrical signals that correspond to transferred data.

The conventional storage device's architecture of FIG. 1 has been designed with the notion that small data files can be transferred to, or from, a storage device using low bit rates because transferring such files would not take much time because of the files being small. However, the conventional storage device's architecture of FIG. 1 is inefficient (i.e., in terms of data transfer speed) when it comes to large data files. There is thus a need for a PSD with increased data transfer speed. In particular, there is a need for a PSD with increased data writing speed.

SUMMARY

It would, therefore, be beneficial to have a storage device that can exchange data with a host, such as a personal computer ("PC"), in a first mode in which relatively small data files can be transferred between the storage device and the host "normally" (i.e., in a conventional bit rate, or in a conventional speed), or in a second mode in which larger data files can be transferred between the storage device and the host at a bit rate that is higher than in the first mode.

Various embodiments are designed to implement such data transfers examples of which are provided herein. The following exemplary embodiments and aspects thereof are described and illustrated in conjunction with systems, tools, and methods, which are meant to be exemplary and illustrative but not limiting in scope.

In one embodiment, a storage device may have two connectors for transferring data files: a first connector through which data files can be transferred at an accelerated speed, and a second connector through which data files can be transferred at a conventional speed. According to the present disclosure a user can select the speed (i.e., "normal speed" or "accelerated speed") at which s/he wants to transfer a data file from a host to the storage device, and vice versa, by connecting the host to the proper connector. The first connector is internally connected to a plurality of controllers that facilitate data transfers at the accelerated speed, and the second connector is internally connected to a controller that facilitates data transfers at the normal speed.

In another embodiment, a method for preparing content such as host content (e.g., multimedia file) for writing into a storage device may include creating, in a host having a first (i.e., host's) file system, a second file system for a storage device (the second file system being referred to hereinafter as the storage device's file system) that includes a plurality of discrete memory units and a plurality of first controllers (the terms "first controllers" and "parallel controllers" are interchangeably used herein); copying host content to the second file system by reading the host content from the first file system and writing the read host content to the second file system; and segmenting the second file system to a plurality of segments that are respectively directed to the plurality of first controllers; that is, each segment is uniquely targeted, associated with or directed to, a specific, designated, or particular controller of the plurality of first controllers.

Creating the second file system may include storing the second file system in a file (which is referred to hereinafter as the "loop file") within the first file system, and segmenting the second file system includes segmenting the loop file within the first file system to a number of segments that equals the number of first controllers, where each segment bears, or contains, a portion of the second file system that contains a portion of the host content.

The method may further include respectively writing the plurality of segments into the plurality of memory units by the plurality of first controllers, for example by writing each of the plurality of segments into one or more of the plurality of memory units by a first controller associated with the one or more of the plurality of memory units.

The method may further include receiving by a second controller of the storage device, via a second connector of the storage device, a read request to read data from an address, for example, of a memory sector in one of the plurality memory units, and reading, by the second controller, the data from a storage area in one of the plurality of memory units that is referenced by the address.

Reading the data from the storage area referenced by the address may include (i) determining a logical page that is associated with the storage area, (ii) determining, from the determined logical page, the memory unit the logical page belongs to, and (iii) determining the physical location of the storage area within the determined flash memory unit. Once the physical location of the storage area within the determined flash memory unit is determined, data can be read from that location.

Copying the host content to the second file system may include a preceding step of mounting the second file system in the first file system, and, after the host content is copied to the second file system, a succeeding step of unmounting the second file system from the first file system.

A method for preparing host content for writing into a storage device may therefore include creating, in a host having a first file system, a second file system for a storage device that includes a plurality of discrete memory units and a plurality of controllers; mounting the second file system in the first file system; copying host content to the second file system by reading the host content from the first file system and writing the read host content into the second file system; unmounting the second file system from the first file system; and segmenting the unmounted second file system to a plurality of segments respectively corresponding to the plurality of controllers.

In yet another embodiment, a storage device is provided. The storage device may include a non-volatile memory that is implemented as a plurality of discrete memory units; a first connector that is also referred to hereinafter as a "rapid-access connector"; a plurality of first controllers, wherein each of the plurality of first controllers is functionally interposed between the first connector and a respective one or more of the plurality of memory units; a second connector; and a second controller that manages data transfers between the second connector and the plurality of memory units.

The plurality of first controllers may manage data transfers between the first connector and the plurality of memory units by receiving, from a host, a file system which is segmented to a plurality of segments that are respectively directed to the plurality of first controllers, and by writing the plurality of segments into the plurality of memory units by the plurality of first controllers, so that each of the first controllers writes the respective segment to the one or more of the plurality of memory units associated with that controller.

In yet another embodiment, one of the first controllers also functions as the second controller, where the first controller functioning also as the second controller manages data transfers between the first connector and a respective one or more of the plurality of memory units, or between the second connector and the plurality of memory units, depending on which connector (i.e., the first connector or the second connector) is used (i.e., by a host with which the storage device operates).

In yet another embodiment, the second controller is adapted to write data into the plurality of memory units and the first controllers are adapted to concurrently read the data from the plurality of memory units in parallel.

The first connector of the storage device may be a rapid-access ("RAC") connector and the second connector may be a USB male A-type connector. The RAC connector may include a plurality of contacts groups, where each contacts group is associated with a particular one of the first controllers. At least one of the non-volatile memory units in the storage device may be, or include, a NAND flash memory.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which:

FIGS. 9A, 9B, and 9C collectively demonstrate mounting of a storage device's file system on a host's file system;

FIG. 11 illustrates a method for reading host content from a storage device according to an example embodiment;

Figure 2:
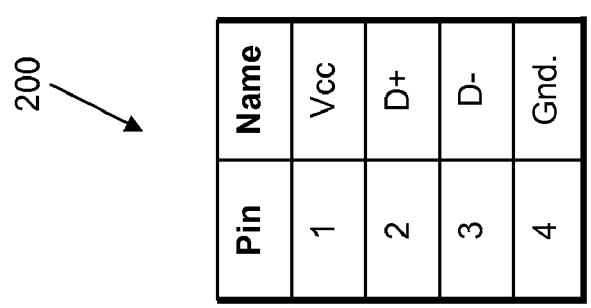
FIG. 2 is a pin layout of a USB connector according to related art.

It will be appreciated that for simplicity and clarity of illustration, elements shown in the figures are not necessarily drawn to scale. Further, where considered appropriate, reference numerals may be repeated among the figures to indicate like, corresponding or analogous elements.

DETAILED DESCRIPTION

The description that follows provides various details of example embodiments. However, this description is not intended to limit the scope of the claims but instead to explain various principles of the invention and the manner of practicing it.

Figure 3:
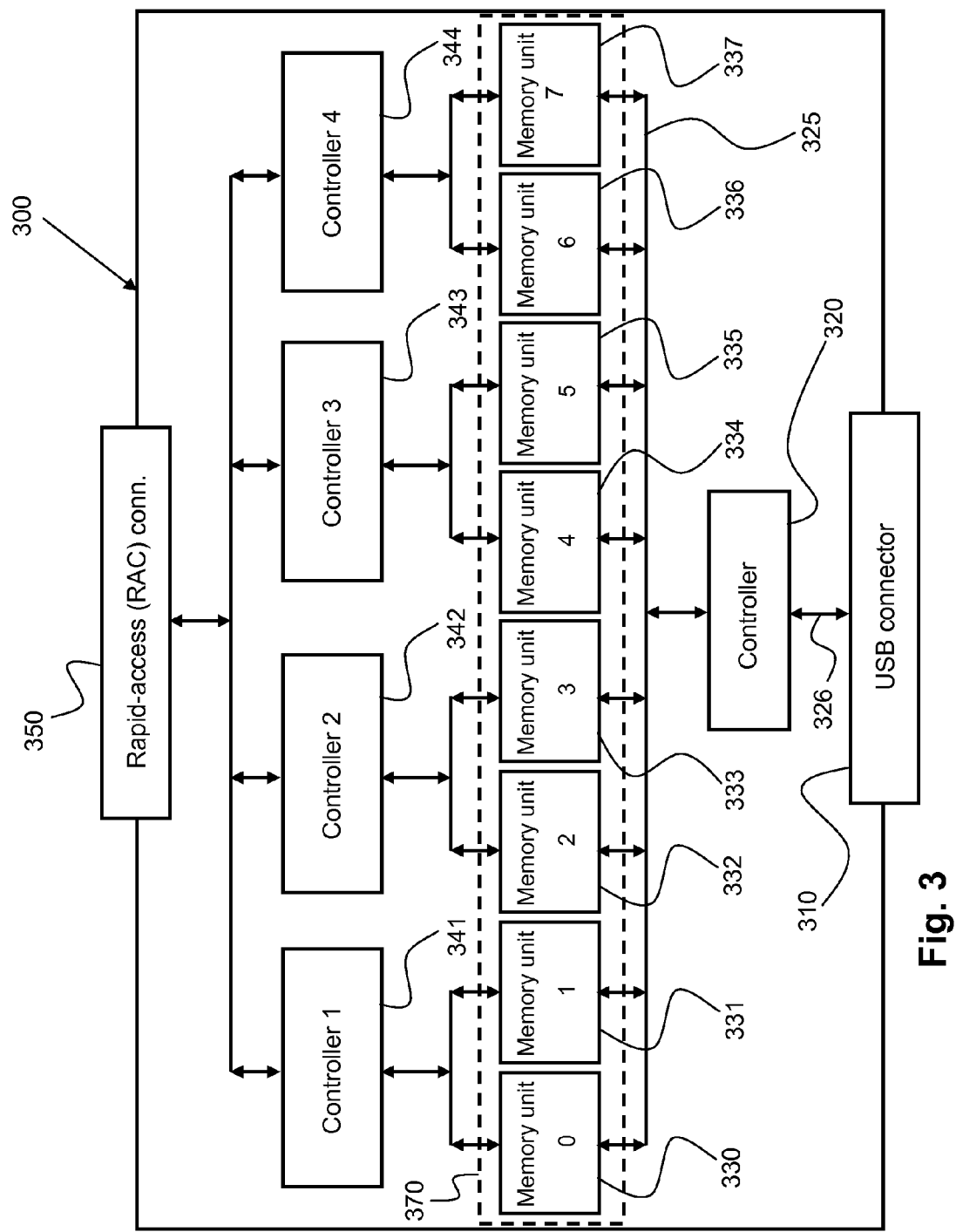
FIG. 3 is a block diagram of a portable storage device according to an example embodiment.

FIG. 3 is a block diagram of a PSD 300 according to an example embodiment. PSD 300 includes a non-volatile memory 370 that is implemented as a plurality of discrete memory units 330, 331, 332, 333, 334, 335, 336, and 337 (the memory units 330 through 337 being respectively designated as "memory unit 0" through "memory unit 7"). By "discrete memory unit" is meant any memory die, memory chip, and memory package that is controlled, handled, or managed by a controller.

PSD 300 also includes a first connector 350 (which is referred to herein as a rapid-access ("RAC") connector), a plurality of first (also referred to herein as "parallel") controllers 341, 342, 343, and 344 (the second controllers 341 through 344 being respectively designated as "controller 1" through "controller 4"). RAC connector 350 may include a plurality of contacts groups, where each contacts group is associated with a particular one of the first controllers 341 through 344.

According to this example embodiment there are eight memory units (i.e., memory units 330 through 337) and four parallel controllers (i.e., first controllers 341 through 344), and each of the four parallel controllers 341 through 344 is functionally interposed between RAC connector 350 and a respective two of the plurality of memory units 330 through 337. For example, controller 341 is functionally interposed between RAC connector 350 and memory units 330 and 331; controller 342 is functionally interposed between RAC connector 350 and memory units 332 and 333, and so on. In general, one or more of the parallel controllers may be functionally interposed between the RAC connector and a respective one or more of the plurality of memory units.

Parallel controllers 341 to 344 are operative to manage data transfers between RAC connector 350 and the plurality of memory units 330 through 337 by receiving, from a host (not shown in FIG. 3) connected to RAC connector 350, by storage device 300 a file system which is segmented to a plurality of file system segments that are respectively directed to the plurality of controllers 341 through 342, and by respectively writing the file system segments into the respective two or more of the plurality of memory units. By "file system segments that are respectively directed to the plurality of controllers" is meant that the number of file system segments equals the number of the plurality of parallel controllers, which is four in FIG. 3, and each of the file system segments is forwarded by the host (not shown in FIG. 3) to a designated controller, via RAC connector 350, to be uniquely handled by that controller. Referring to the four exemplary controllers 341 through 344, a file system for storage device 300 will be segmented by a host (i.e., when it is connected to RAC connector 350) to four file system segments, and the host will concurrently send a first segment of the file system (i.e., a first file system segment) to parallel controller 341, a second segment of the file system to parallel controller 342, a third segment of the file system to controller 343, and a fourth segment of the file system to controller 344. Each parallel controller will, then, write the file system segment it receives from the host in the memory units associated with that controller.

It is noted that according to the present disclosure the number of parallel controllers may be other than four (i.e., there may be less or more than four parallel controllers), the number of plurality of discrete memory units may be other than eight (i.e., there may be less or more than eight memory units), and each of the plurality of parallel controllers may functionally be interposed between RAC connector 350 and a number of memory units that is larger than two. For example, there may be 16 parallel controllers, and each of the 16 parallel controllers may functionally be interposed between "RAC" 350 and 4 memory units.

PSD 300 also includes a second connector 310 that may be a USB connector (as shown in FIG. 3) of a standard type, or a non-USB connector. PSD 300 also includes a second controller 320 that is operative to manage data transfers between second connector 310 and the plurality of memory units.

Memory units 330 through 337 are non-volatile memory units that may be of the flash memory type (for example they may be implemented as standard NAND flash memory chips), or of the non-flash type. Alternatively, at least one of memory units 330 through 337 may be of the flash memory type while other memory units are of the non-flash type. Alternatively, at least one of memory units 330 through 337 may be of the non-flash memory type while other memory units are of the flash type.

Figure 1:
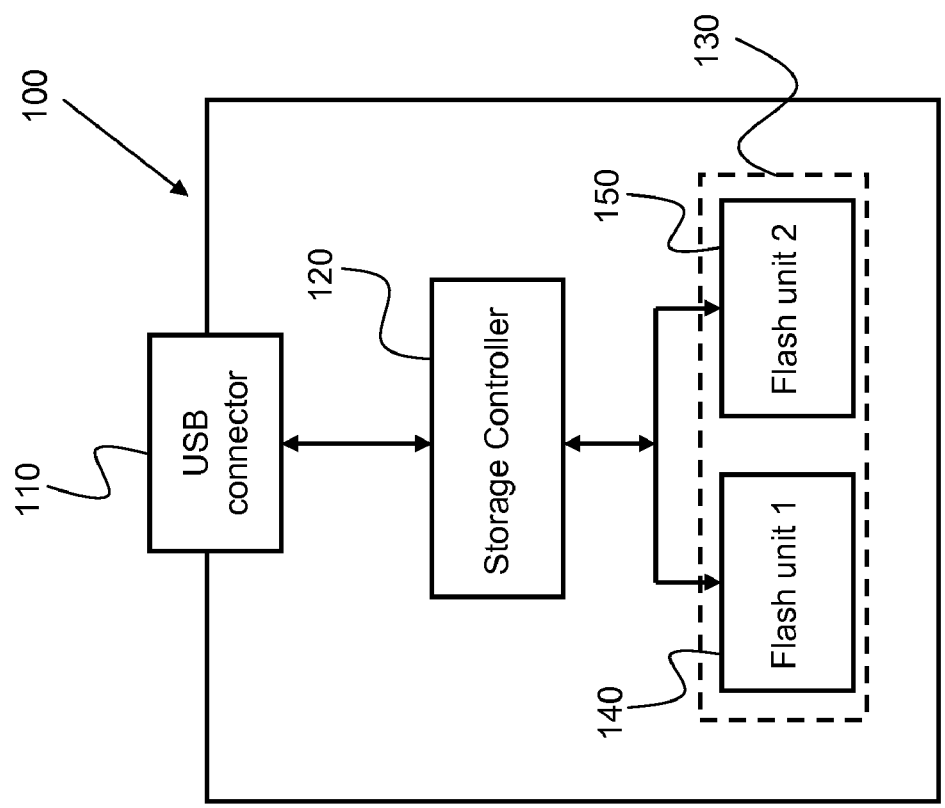
FIG. 1 is a portable storage device according to related art.
Figure 4:
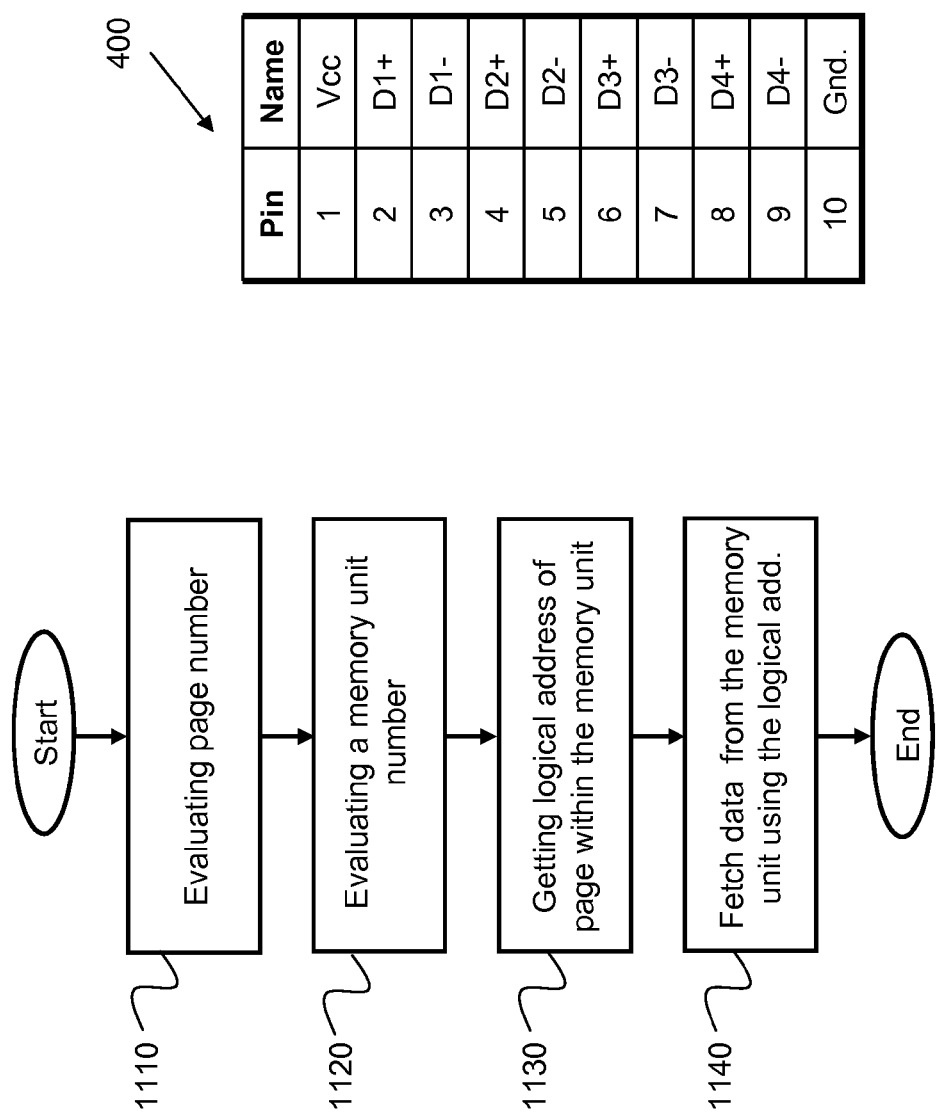
FIG. 4 is a pin layout of a multi USB connector for a portable storage device according to an example embodiment.

First connector 350, a rapid-access connector, provides more than one communication link. For example, first connector 350 may include four separate USB links, or one USB link and other one or more non-USB links. Second connector 310 may be a USB connector, for example of the male A-type connector. The pin layout of USB connector 310 may be identical to the pin layout of USB connector 110 of FIG. 1, and RAC connector 350 may have a pin layout as shown in FIG. 4 (described below) which, by way of example, has four separate USB interfaces D1, D2, D3, and D4, where "D1" refers to the contacts pair "D1+/D1−", "D2" refers to the contacts pair "D2+/D2−", and so on. Referring to FIG. 4, RAC connector 350 includes four contacts groups, where each contacts group is associated with a particular one of the first controllers 341 through 344. For example, contacts group D1 may be associated with first controller 341, contacts group D2 may be associated with first controller 342, etc. Assuming that RAC connector 350 has the pin layout shown in FIG. 4, each of the four separate USB interfaces D1 through D4 is connected to a corresponding controller 341, 342, 343, 344 that manages two memory units. Memory units 330 through 337 may have the same storage capacity, or different storage capacities.

Controller 320, which may be some standard memory controller, addresses memory units 330 through 337 via a communication bus 325. Controller 320 may interface 326 with standard USB hosts (not shown in FIG. 3), for example, via a USB male "A"-type connector 310 whose pin layout is as shown in FIG. 2.

Each of controllers 341 through 344 handles storage operations (i.e., "write", "read", and "erase" operations) in the same way as, and therefore it can be, a conventional USB flash drive controller which is well-known in the art of portable storage devices. Controllers 341 through 344 may be of the same type (i.e., each of them may include the same type of communication interface, for example, a USB communication interface), in which case RAC connector 350 may have a pin layout such as the pin layout shown in FIG. 4, which exemplary pin layout provides four separate and independent USB communication links. Alternatively, each of controllers 341 through 344 may be of a different type (i.e., each controller may include a different type of communication interface), in which case RAC connector 350 may have a different pin layout than the pin layout shown in FIG. 4, which provides four separate, independent and different communication links. At least one of controllers 341 through 344 may include a USB communication interface.

If an end-user wants to download a massive file (e.g., a 4-gigabyte file) from a host to storage device 300, the end-user connects storage device 300 to the host (not shown in FIG. 3) via RAC connector 350. Upon, or subsequent to, connecting RAC connector 350 to the host the host handshakes with each of parallel controllers 341 through 344 and handles it as if it belongs, or represents, a separate storage device. In order to facilitate fast writing of the massive file into non-volatile memory 370 the host creates a new file system for storage device 300, copies the massive file to the new file system, and then divides the new file system (with the massive file copied thereto) to a number of file system segments that corresponds to the number of the parallel controllers of storage device 300 (i.e., the file system for the storage device is segmented to one file system segment per controller). Finally, the host communicates with, and forwards to, each parallel controller a file system segment that is directed, or targeted, to that parallel controller. A host connected to storage device 300 via RAC connector 350 logically "knows" the entire storage layout of non-volatile memory 370 from the parallel controllers 341 through 344 and the distributes the new file system (with the copied massive file) between the parallel controllers 341 through 344 based on that knowledge. The division and distribution of the file system segments is elaborated, for example, in FIGS. 5, 6, 8, and 9, which are described below.

Referring to FIG. 4 it describes an exemplary rapid-access connector ("RAC") 400. Each D+/D− pair is wired, or otherwise connected, to a respective parallel controller. For example, pins 2 and 3 (pair D1+/D1−) may be connected to controller 341, pins 4 and 5 (pair D2+/D2−) may be connected to controller 342, and so on. Pins 1 and 10 respectively enable supplying from the host the voltage and ground potential required to energize PSD 300.

A host connected to PSD 300 via 10-pin RAC such as connector 400 "sees" PSD 300 as four discrete USB mass storage devices, and, therefore, handles them individually, whereas if the host is connected to PSD 300 via connector 310 the host sees PSD 300 as a single mass storage device, as the host can address all eight memory units 341 through 344 as a single, unified, non-volatile memory. Sectors comprising the file system are distributed evenly throughout the memory units 341 through 344.

Preparing a File System for a Storage Device

Figure 5:
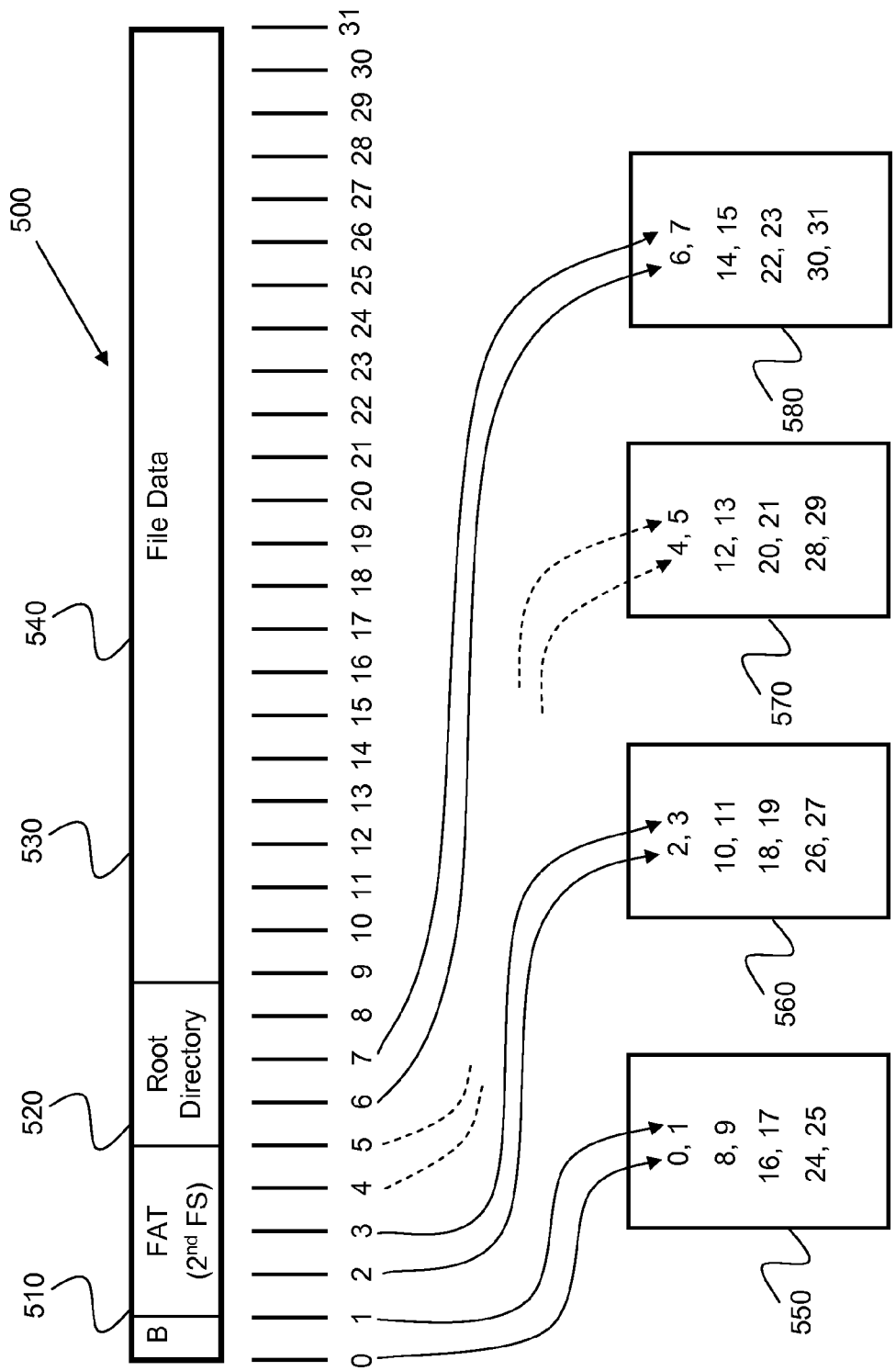
FIG. 5 shows preparation of a file system for a storage device according to an example embodiment.

FIG. 5 shows preparation of a file system 500 for a storage device according to an example embodiment. FIG. 5 will be described in association with FIG. 3. When an end-user wants to download content (e.g., a video file) from a host to PSD 300, the end-user "marks" to the host the content s/he wants downloaded to PSD 300 and the host prepares the marked content for writing into PSD 300. The host prepares the content for writing into PSD 300 by using its own file system (referred to herein as the "first file system"), as follows. First, the host creates a second file system that will be sent to, and used by, PSD 300. Then, the host copies the marked (host) content to the second file system by reading the marked content from the first (i.e., from the host's) file system and writing the read content to the second file system. Then, the host segments the second file system to a plurality of file system segments, the plurality of segments being respectively directed to the plurality of parallel controllers 341 through 344.

Referring to FIG. 5 the host prepares the second file system by first creating an empty file system 520 within a new file 500 (which is referred to herein as the "loop file") is created by the host on the host's file system (i.e., on the first file system). After the host creates the empty file system 520 the host copies the content requested by the end-user (i.e., the marked content) to empty file system 520. It may be said, therefore, that empty file system 520 is updated with the user-requested host content.

Loop file 500 that is created by the host to transfer the second file system to PSD 300 includes other data and information that are pertinent to, and characterize, that file. That is, loop file 500 includes, in addition to second file system 520, a boot portion 510, a root directory 530 and file data 540. Boot portion 510 contains booting data that will be used to initialize storage device 300. FAT section 520 contains information relating to the used FAT system. Root directory 530 is the root directory that will be used by storage device 300. File data 540 contains the actual file extents contained within the file system.

By way of example, file system 500 is divided to 32 data pages (designated as data page #0 through data page #31). Assuming the storage device to which the massive file is targeted includes four parallel controllers, the host prepares four file system segments, designated as 550, 560, 570, and 580.

After the host updates the second file system with the content requested by the end-user the host divides loop file 500 to four file segments, designated as 550, 560, 570, and 580 because, as stated above, PSD 300 includes four parallel controllers and each parallel controller uniquely receives one file segment. A "file segment" (e.g., file segment 550) is a file that bears information related, or that corresponds, to a segment. Loop file 500 has a bit-wise size that substantially equals the bit-wise size of non-volatile memory 370 as a whole. Creating loop file 500 in that manner can be done, for example, by using the Linux command 'mkfs'.

Assuming that non-volatile 370 is a flash memory, the host divides loop file 500 into equal segments based on the page size of non-volatile 370. In the field of flash memory a "page" is a memory unit that includes some minimal number of sectors, that depends on the type of the flash memory (i.e., it depends on the basic size of a page). For example, given the fact that, currently, the size of a sector is 512 bytes, a flash memory having 2K-sized pages has four sectors per page. Page's sectors are written to and read from collectively. In the flash memory field data is erased from the flash memory in blocks, where a block includes several pages.

In the example shown in FIG. 5 file 500 is divided into 32 pages, where each page has the same bit size as the native flash page. The actual number of pages depends on the size of the host content requested by the end-user. That is, the larger the requested content the larger the number of the pages. The segmentation process results, in this example, in creating four files (i.e., 550, 560, 570, 580), where two pages are alternately stored in each file such that at the end of the process file 500 is segmented as depicted in FIG. 5.

It is also assumed that the bit size of non-volatile 370 of PSD 300 is 32 pages and that each of the four parallel controllers 341 through 344 is functionally connected to two memory units. Therefore, file 500 is divided to 32 pages, and the 32 pages are distributed to four groups (i.e., file segments) 550, 560, 570, and 580 in the following way: the first two pages (i.e., pages 0 and 1) are associated with file segment 550, the next two pages (i.e., pages 2 and 3) are associated with file segment 560, the next two pages (i.e., pages 4 and 5) are associated with file segment 570, the next two pages (i.e., pages 6 and 7) are associated with file segment 580, the next two pages (i.e., pages 8 and 9) are associated with file segment 550, and so on. If each parallel controller is functionally connected, for example, to four memory units, then the first four pages (i.e., pages 0, 1, 2, 3) were to be associated with file segment 550, the next four pages (i.e., pages 5, 6, 7, 8) were to be associated with file segment 560, and so on. In the end of the segmentation process file segment 550 includes pages 0, 1, 8, 9, 16, 17, 24, and 25, file segment 560 includes pages 2, 3, 10, 11, 18, 19, 26, and 27, file segment 570 includes pages 4, 5, 12, 13, 20, 21, 28, and 29, and file segment 580 includes pages 6, 7, 14, 15, 22, 23, 30, and 31.

Figure 6:
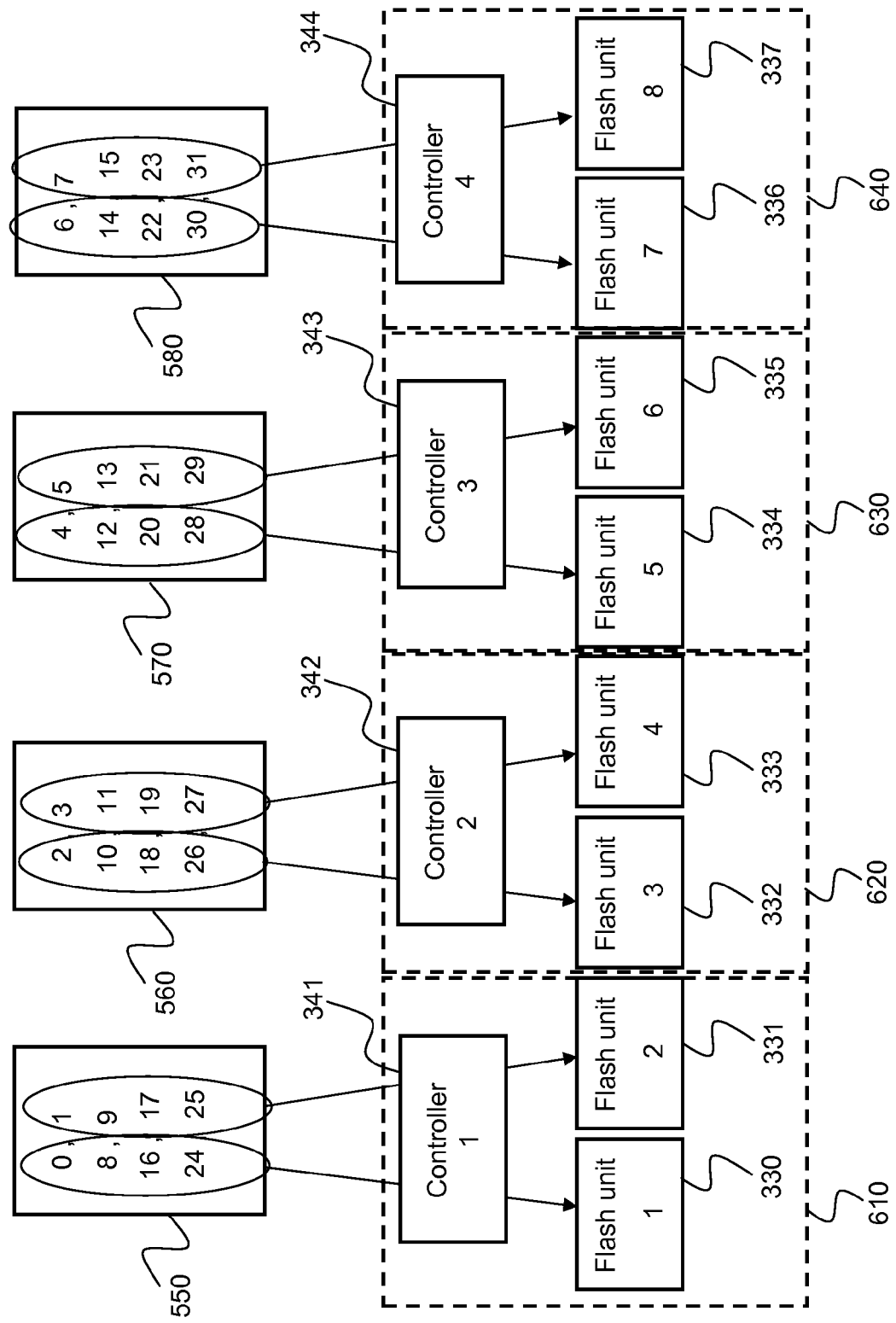
FIG. 6 shows writing segments of the file system of FIG. 5 according to an example embodiment.

FIG. 6 shows writing segments of the segmented file of FIG. 5 according to an example embodiment. FIG. 6 will be described in association with FIGS. 3 and 5. After the host completes the preparation of the four file segments 550, 560, 570, and 580, a rapid write process can commence by the host concurrently handshaking with controllers 341 through 344 and, thereafter, forwarding to each controller a file segment that is intended for, or is directed to, or is associated with, that controller. As explained above the host (not shown in FIG. 6) handles controllers 341 through 344 individually, as if they represent four distinct storage devices 610, 620, 630, and 640. That is, the host forwards file segment 550 to controller 341, file segment 560 to controller 342, file segment 570 to controller 343, and file segment 580 to controller 344, as illustrated in FIG. 6. As explained above, each of parallel controllers 341 through 344 is functionally connected to two memory units. Accordingly, each controller writes half of the pages within its file segment in one of the memory units, and the other half of the pages in the other memory unit. For example, controller 341 writes pages 0, 8, 16, and 24 into memory unit 330, and pages 1, 9, 17, and 25 into memory unit 331.

Figure 7:
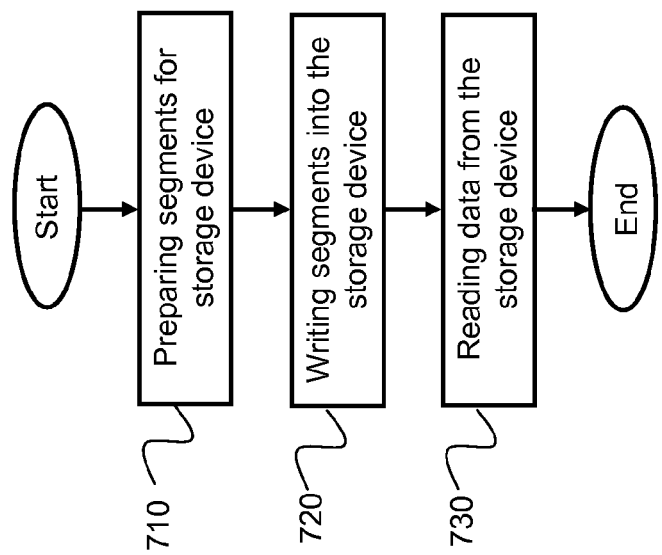
FIG. 7 shows a host content write-read cycle according to an example embodiment.

FIG. 7 shows a file write-read cycle according to an example embodiment. FIG. 7 will be described in association with FIGS. 3 and 5. At step 710 loop file 500 is created by a host on the host's file system, after which the host creates second file system 520 on loop file 500 for storage device 300, updates second file system 520 with a content an end-user of the storage device wants to be downloaded to storage device 300, and segments loop file 500, with the updated second file system 520 on it, to four (i.e., to files 550 through 580), which is the number of parallel controllers 341 through 344.

At step 720 the host concurrently writes file segments 550 through 580 into storage device 300 by using parallel controllers 341 through 344. If required or desired, at step 730 the host may read the content from the storage device either by using parallel controllers 341 through 344 (i.e., by using RAC connector 350), or by using controller 320 (i.e., by using USB connector 310). At step 730, therefore, the file is read by the host. Because the host writes content into storage device 300 using parallel controllers (which means that the content is distributed among several memory units that are managed or controlled by different parallel controllers, then if the host reads the content from storage device 300 by using parallel controllers 341 through 344, it does so by aggregating the distributed content from the various memory units by using the corresponding parallel controllers.

Figure 8:
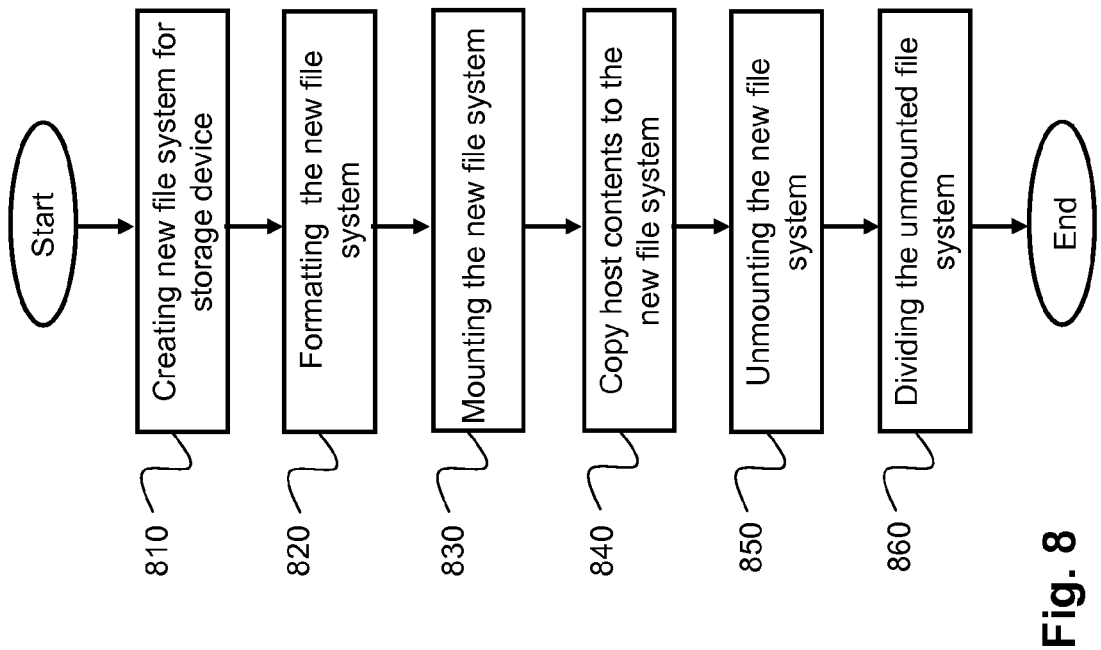
FIG. 8 illustrates a method for preparing a new, segmented, file system for a storage device according to an example embodiment.

FIG. 8 illustrates a method for preparing a new, segmented, file system for a storage device according to an example embodiment. At step 810 a host uses its own file system to create an empty file system for a storage device to which host content (e.g., multimedia file) is to be downloaded by an end-user of the storage device. That is, the host creates an empty storage device's file system on its own file system and uses a mounting-unmounting mechanism to update the empty storage device's file system with the host content. The mounting-unmounting mechanism is used because the host can manage (i.e., create, move, update, etc.) only files (including file systems) that are referenced (i.e., can be accessed) by the host's directory tree. This means that the host can update the storage device's file system with host content only after the storage device's file system is logically linked (i.e., "mounted") to, or becomes part of, the host's file system.

Mounting and Unmounting a Loop File

"Mounting" is a process in which an additional file system is logically attached, or connected, to a currently accessible file system of a computer. A file system is a hierarchy of directories (also referred to as a directory tree) that is used to organize files on a computer or storage media. On computers running Linux, MacOS, or other Unix-like operating systems, the directories start with the root directory, which is the directory that contains all other directories and files on the system. The "currently" accessible file system is the file system that can be accessed on a computer at a given time.

A "mount point" is the directory (usually an empty one) in the currently accessible file system to which the additional file system is mounted. The mount point becomes the root directory of the added directory tree, and the added directory tree becomes accessible from the directory to which it is mounted (i.e., its mount point). In Unix-like systems the mount point is the location in the operating system's directory structure where a mounted file system appears. Removing the connection or link between a mounted device and the rest of the file system is referred to as "unmounting".

Loop Device

In Unix-like operating systems a "loop device" is a pseudo-device that makes a file accessible as a pseudo-device. Because loop devices allow seeing a regular file as a "device", they allow for mounting those regular files that contain an entire file system. Mounting a file that contains a file system via such a loop mount makes the files within that file system accessible as regular files that are located on the mount point directory.

At step 820 the storage device's file system is formatted and at step 830 the formatted storage device's file system is mounted into the host's file system to enable the host to update it with the host content. Step 830 is required because, as explained above, the host can update the storage device's file system with the content only after the storage device's file system is logically linked (i.e., mounted) to the host's file system.

At step 840 the host copies the content to the storage device's file system, and, subsequent to copying the host content to the storage device's file system, at step 850 the storage device's file system is unmounted from the host's file system. At step 860 the unmounted storage device's file system is divided to as many segments as required, as described above.

FIGS. 9A, 9B, and 9C demonstrate mounting a storage device's file system on a host's file system. FIG. 9A shows an exemplary host's file system 900 to which a storage device's file system is to be mounted. By way of example host's file system 900 includes five data files (designated as "F1", "F2", "F3", "F4", and "F5"). FIG. 9B shows an exemplary storage device's file system 910 that the host is yet to send to a storage device. By way of example storage device's file system 910 includes one data file (designated as "F11").

A preceding step, before storage device's file system 910 can be mounted on host's file system 900, is storing storage device's file system 910 in a loop file 920, which serves as a loop device. FIG. 9C shows loop file 920 added, or "mounted", to host's file system 900 of FIG. 9. By handling loop file 920 like a loop device the host can update storage device's file system 910 with content 930 by "sending" content 930 to loop file 920 as if loop file 920 were a physical device.

Figure 10:
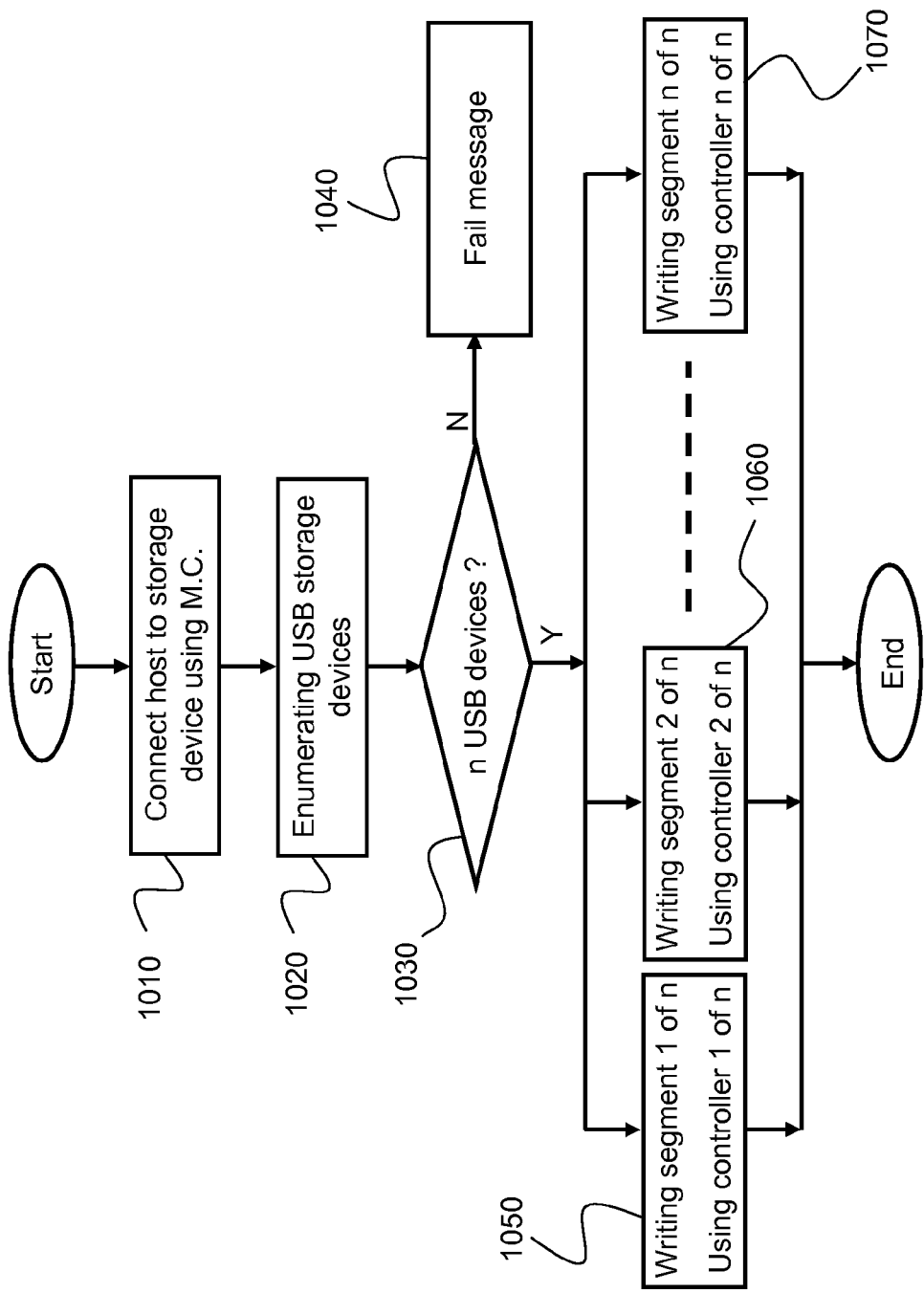
FIG. 10 illustrates a method for writing a new file system into a storage device according to an example embodiment.

FIG. 10 shows a method for writing a new file system into a storage device according to an example embodiment. FIG. 10 will be described in association with FIGS. 3 and 5. Following the segmentation of loop file 500 a rapid write process can commence. At step 1010 the rapid-access connector 350 is connected to the host (not shown in FIGS. 3 and 5).

As explained before in connection with FIG. 6, storage device 300 appears to the host as four, separate, physical USB mass storage devices 610, 620, 630, and 640. Accordingly, at step 1020 the host enumerates the USB storage devices it identifies within storage device 300. In order to ascertain that storage device 300 has mounted properly (i.e., the number of file segments is identical to the number of parallel controllers), it is checked at step 1030, by the host, whether the number of USB storage devices is the expected number n ("n" being the number of parallel controllers, where n=4 in FIGS. 3 and 6). If the number of USB storage devices is the expected number n (shown as "Y" at step 1030), the segments are written into the apparently separate n USB storage devices concurrently as raw data; that is, no file system is prepared on the individual USB storage devices. That is, segment 1 (of n segments) is written into controller 1 of n parallel controllers (shown at 1050), segment 2 is written into controller 2 (shown at 1060), . . . , and segment n is written into controller n (shown at 1070).

FIG. 11 illustrates a method for reading host content from a storage device according to an example embodiment. FIG. 11 will be described in association with FIGS. 3 and 6. Connector 310 and controller 320 of FIG. 3 are used to read data from non-volatile memory 370. Controller 320 can read all eight memory units 330 through 337 directly, using the same logical pages' layout as shown in FIG. 5, by logically mapping pages according to the same logical pages layout described in FIG. 5. When storage device 300 receives from the host a read command to read a sector S on a specific memory page P in non-volatile memory 370, controller 320 calculates the associated memory physical address as described below.

At step 1110 controller 320 calculates the logical page P that the sector S is on by using formula (1):

$$P = \frac{S}{P_S/S_S} \quad (1)$$

wherein S is the sector number, Ps is the page size, and Ss is the size of a sector.

For example, assuming a page size (Ps) of 2048 bytes, a sector size (Ss) of 512 bytes, and S=14, then, using formula (1), the logical page P associated with S=14 is:

$$P = \frac{S}{P_S/S_S} = \frac{14}{2048/512} = \frac{14}{4} = 3.5$$

Starting with sector #0 "P=3.5" means (after truncating or discarding the remainder "0.5") that the requested sector (i.e., sector #14) resides on the fourth logical page on a memory unit associated with the controller that received the read request to read sector #14.

At step 1120 controller 320 calculates the memory unit MU on which a sector reside by using formula (2):

$$MU = P \bmod U_t \quad (2)$$

where P is the logical page found by using formula (1) and Ut is the total number of memory units that non-volatile memory 370 includes. Continuing the example above, if the logical page is P=3 and there are eight (8) memory units altogether, then, using formula (2), the memory unit MU is:

$$MU = P \bmod U_t = 3 \bmod 8 = 0$$

Starting with MU #0 "MU=0" means that sector 14 resides on memory unit 0.

At step 1130 controller 320 calculates the logical address Al within the memory unit MU by using formula (3):

$$A_l = \frac{P}{U_t} \quad (3)$$

Continuing the example above (i.e., P=3 and Ut=8), and using formula (3), the logical address associated with S=14 is:

$$A_l = \frac{P}{U_t} = \frac{3}{8} \rightarrow 0$$

Then, at step 1140 the controller fetches the physical page from the corresponding (i.e., calculated) flash memory unit by using the native protocol of the flash memory units.

It will be appreciated by one skilled in the art of storage management that a logical address of a page may be related to a physical page address by using, for example, a logical address-to-physical address translation table, or another mechanism, as appropriate to the specific memory technology (e.g., flash technology, for example NAND flash technology).

FIG. 11 has been described in connection with controller 310 of FIG. 3. However, if storage device is connected to the host using RAC CONNECTOR 350 (i.e., the parallel controllers 341 through 344 are used), the host uses a method similar to the method shown in FIG. 11, as described below in connection with FIG. 12.

Figure 12:
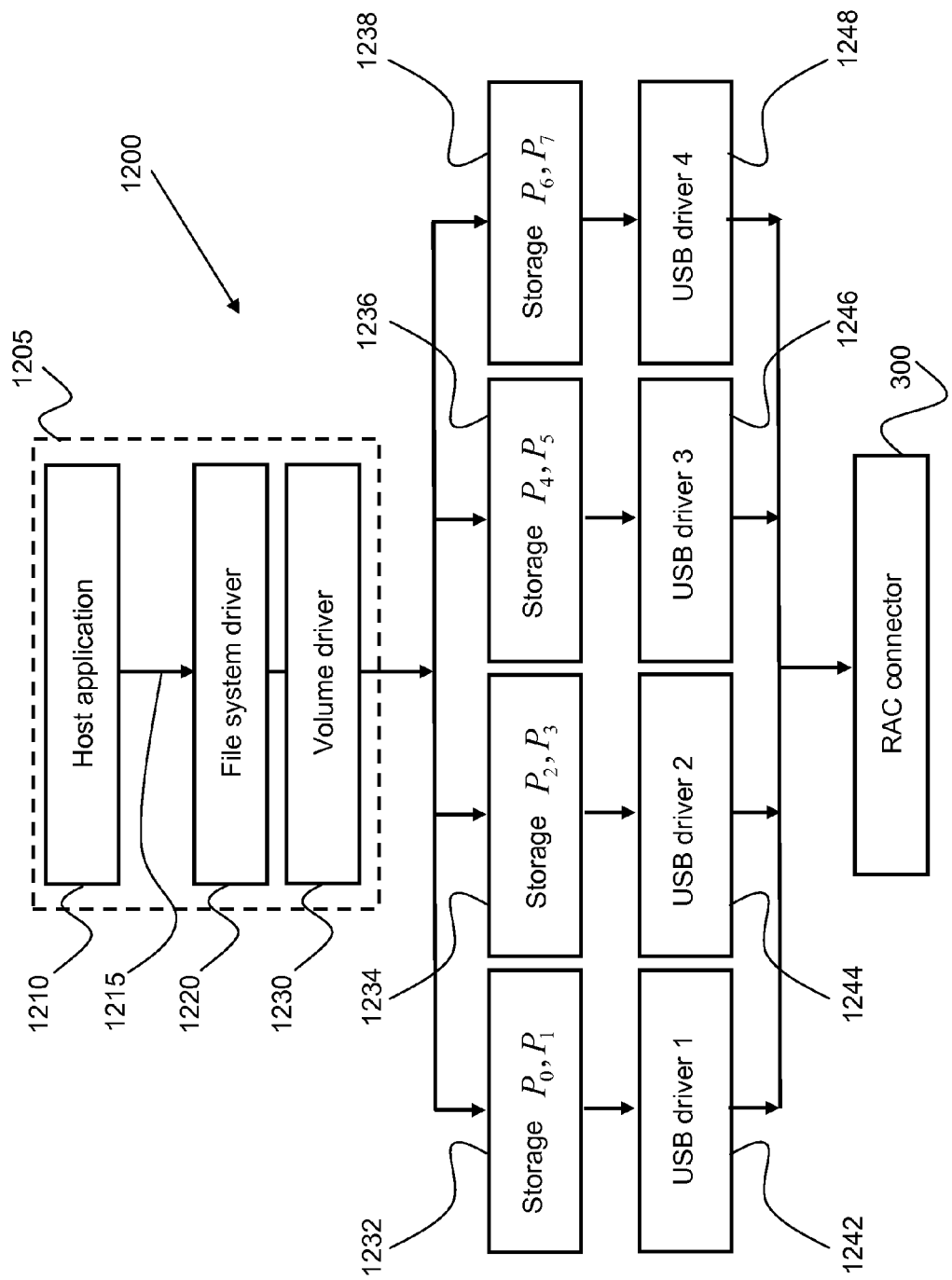
FIG. 12 shows a host device stack for reading host content from a storage device according to another example embodiment.

FIG. 12 is a host device stack 1205 that implements a method for reading host content from a storage device according to another example embodiment. Host application 1210, which can be any host application that can read content from the storage device, interfaces with the host's file system driver 1220. In Windows this is done by using calls such as CreateFile( ), or via the Windows Explorer. In Linux this is done by using standard POSIX file interface calls such as open( ) or creat( ). To the host application, interface 1215 represents a standard portion of the operating system environment.

File system driver 1220 logically resides above the physical interface drivers of the host 1205 and it interfaces between an application and a corresponding hardware component (e.g., a connector, a flash memory, a hard drive, etc.). For example if an application needs to read a file residing, for example, on a hard drive, the operating system translates the read request to the corresponding hardware component (e.g., to the hard drive) by using a stack of drivers. File system driver 1220 transparently reads and writes files through the rapid-access connector (RAC) of the storage device. While FIG. 12 illustrates a Windows driver stack that uses a volume driver 1230, the same concept is likewise applicable, mutatis mutandis, to other operating system environments.

Volume driver 1230 incorporates and employs the algorithm illustrated in FIG. 11. By "volume" is meant a set of sequential blocks (e.g., a set of sectors, clusters, etc.) that can hold a file system. The resulting page number P, as calculated using formula (1) above, is used to select a storage interface from storage interface 1232, 1234, 1236, and 1238. Storage interfaces 1232 through 1238 are respectively operatively associated with USB drivers 1242 through 1248. Thus, storage interfaces P0 and P1 (shown as storage interface 1232) route read requests to USB driver-1 (shown at 1242), which maps to pins 1, 2, 3, and 10 on RAC 300. Storage interfaces P2 and P3 (shown as storage interface 1234) route read requests to USB driver-2 (shown at 1244), which maps to pins 1, 4, 5, and 10 on RAC connector 100, and so on. Volume driver 1230 abstracts sector read requests and write requests and poses to file system driver 1220 as a single mass storage interface. In other words, high-level applications can handle the RAC of the storage device as a single interface rather than four separate interfaces. This can be done because volume driver 1230 presents the four USB drivers (that operate "on behalf of", or represent, four USB storage devices) to the host as a single volume.

Figure 13:
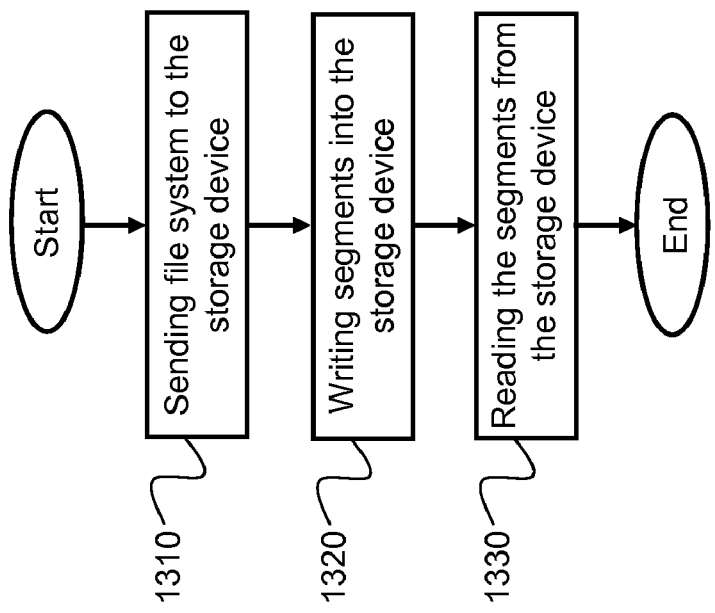
FIG. 13 shows a host content write-read cycle according to another example embodiment.

FIG. 13 shows a host content write-read cycle according to another example embodiment. FIG. 13 will be described in association with FIG. 3. At step 1310 a host creates a file system for storage device 300 and updates the file system with a host content that an end-user of the storage device wants to be downloaded to storage device 300. At step 1320 the host writes the file system into storage device 300 by using controller 320. Controller 320 segments the file system to a number of segments that is equal to the number of parallel memory units (in FIG. 3 to eight segments) and writes each segment into a corresponding memory unit.

If required or desired, at step 1330 the host storing the content in storage device 300 (or another host) may read the content from storage device 300 either by using parallel controllers 341 through 344 (i.e., by using RAC CONNECTOR 350) or by using controller 320 (i.e., by using USB connector 3 10). Because the host content written into storage device 300 is distributed among several memory units, the host can read the host content from storage device 300 by using controllers 341 through 344 to reassemble the distributed file system by aggregating the various file system segments.

Figure 14:
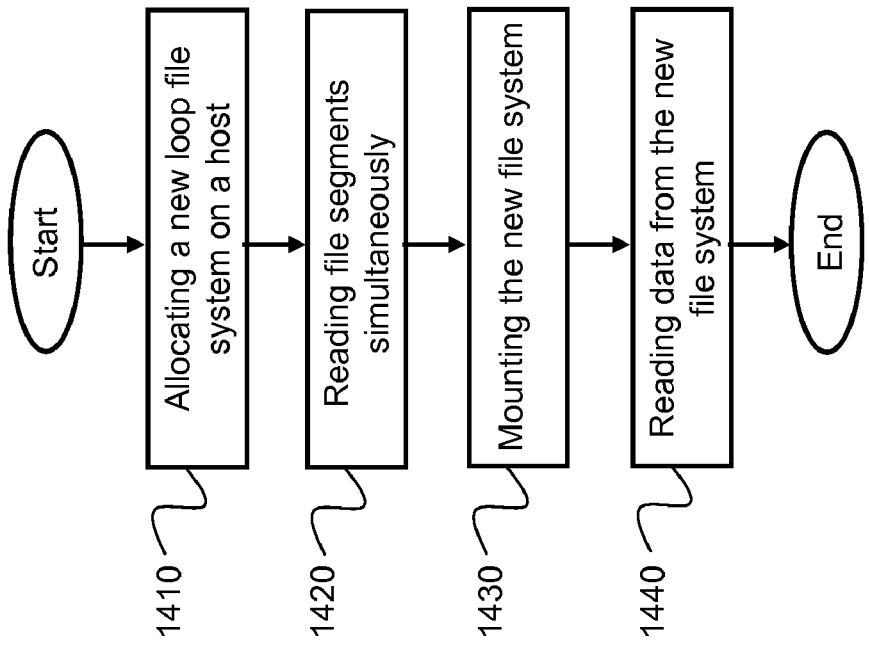
FIG. 14 illustrates a method for (re)assembling a segmented file system in a host according to an example embodiment.

FIG. 14 illustrates a method for assembling a segmented file system in a host according to an example embodiment. At step 1410 a new loop file system is allocated on the host, equal to the size of the storage space on the storage device. At step 1420, the segments of the segmented file system are read simultaneously from the memory units to predefined offsets within the loop file system. For example, if the file system was divided as illustrated in FIG. 5, sectors 0 and 1 as read from the first controller and placed at offset 0 and 1 within the loop file system, and sectors 0 and 1 as read from the second controller are placed at offsets 2 and 3 within the loop file system, and so on (the loop file system is not mounted at this point). At step 1430 the loop file system is mounted and at step 1440 data is read from the loop file system.

Figure 15:
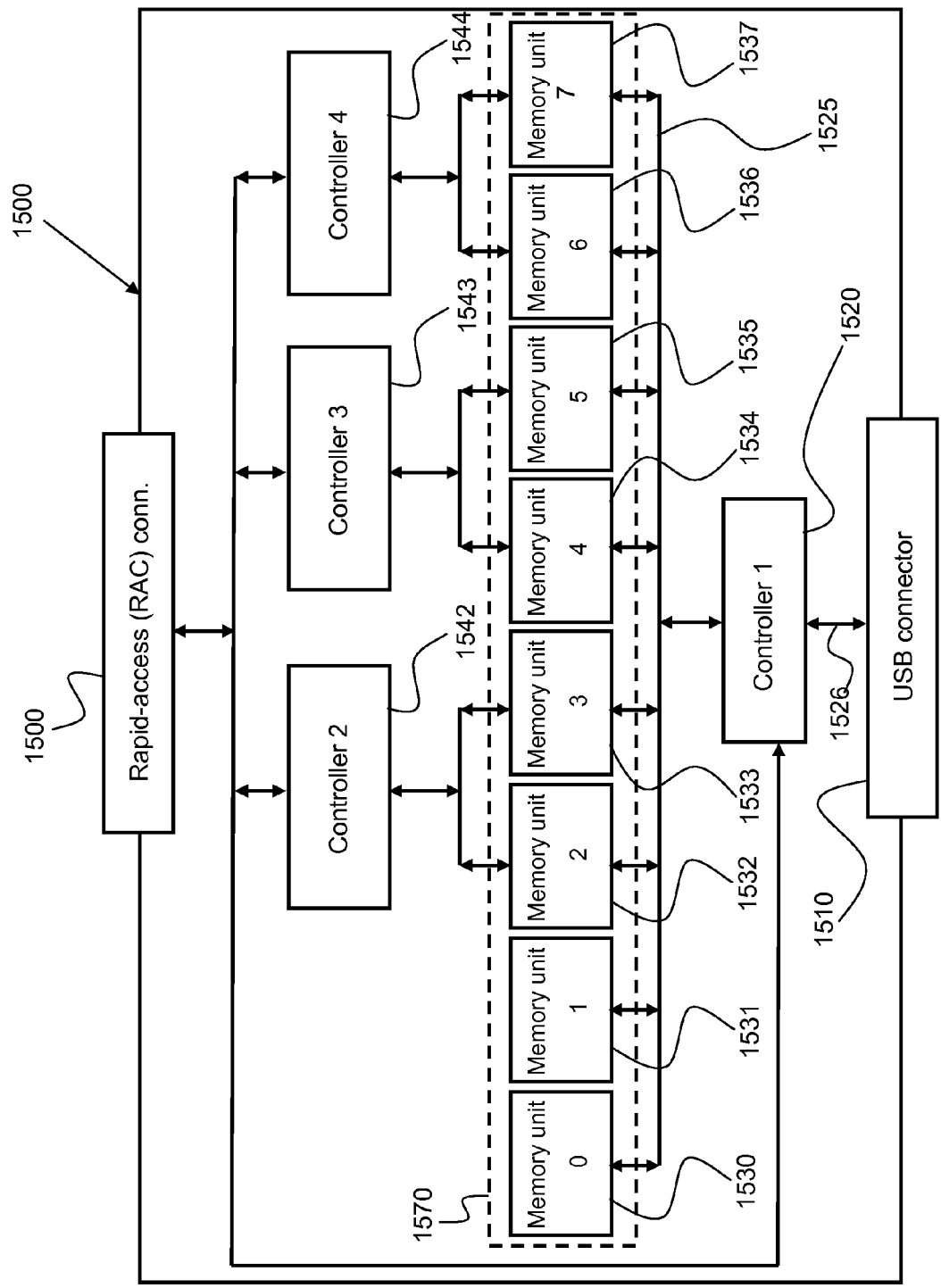
FIG. 15 is a block diagram of a portable storage device according to another example embodiment.

FIG. 15 is a block diagram of a portable storage device 1500 according to another example embodiment. Portable storage device 1500 differs from portable storage device 300 in that one of the first controllers of storage device 300 (e.g., controller 341 of storage device 300) takes on also the functionality of second controller 320 of FIG. 3. The first controller taking on the tasks of the second controller is referenced by reference numeral 1520.

First controller 1520 can serve as a first controller at one time and as a second controller at another time, depending on a connection signal that first (or second) controller 1520 receives from connector 1510 or from RAC connector 1550. If storage device 1500 is connected to a host via connector 1510, connector 1510 sends a corresponding signal to controller 1520, responsive to which signal controller 1520 functions as second controller 320. If storage device 1500 is connected to a host via connector 1550, connector 1510 sends a corresponding signal to controller 1520, responsive to which signal controller 1520 functions as first controller 341.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules. The present disclosure is relevant to various types of mass storage devices such as SD-driven flash memory cards, flash storage device, non-flash storage devices, and so on, and to various data read-write speeds. Hence the scope of the claims that follow is not limited by the disclosure herein.

What is claimed is:

1. A storage device comprising:
   a non-volatile memory implemented as a plurality of memory units;
   a first connector to a host that is associated with a first data transfer rate;
   a plurality of first controllers, wherein each of the plurality of first controllers is functionally interposed between the first connector and a respective one or more of the plurality of memory units, and wherein each of the plurality of first controllers is enumerable by the host as a distinct storage device when the first connector is connected to the host;
   a second connector that is associated with a second data transfer rate, wherein the second data transfer rate differs from the first data transfer rate; and
   a second controller operative to segment a first file system into a first plurality of segments and to write the first plurality of segments to the plurality of memory units,
   wherein the plurality of first controllers is operative to:
      reassemble the first plurality of segments responsive to a data read request;
      receive from the host a second file system that is segmented into a second plurality of segments, each of the second plurality of segments being uniquely associated with a particular one of the plurality of first controllers; and
      write the second plurality of segments into the plurality of memory units by the plurality of first controllers, each of the plurality of first controllers writing the respective segment to the one or more of the plurality of memory units associated with that controller.

2. The storage device as in claim 1, wherein a particular data transfer rate to transfer data between the host and the non-volatile memory is selected from one of the first data transfer rate and the second data transfer rate by connecting of one of the first connector and the second connector to the host.

3. The storage device as in claim 1, wherein the first connector is a rapid-access connector and the second connector is a universal serial bus (USB) male A-type connector.

4. The storage device as in claim 1, wherein at least one of the plurality of memory units includes a NAND flash memory device.

5. The storage device of claim 1, wherein each segment in the second plurality of segments includes at least one page of data and each page includes a plurality of consecutive data bytes, and wherein each page is stored entirely in one of the plurality of memory units.

6. The storage device of claim 1, wherein the plurality of first controllers includes the second controller.

7. The storage device of claim 1, wherein the second controller is configured to write to the plurality of memory units and wherein the plurality of first controllers is configured to read from the plurality of memory units in parallel.

8. The storage device of claim 1, wherein the second connector is a universal serial bus (USB) interface and wherein the first connector includes a plurality of distinct USB interfaces.

9. The storage device of claim 1, wherein the first connector includes a power pin, a corresponding pair of data pins for each of a plurality of distinct universal serial bus (USB) interfaces, and a ground pin.

10. A method comprising:
    at a data storage device with a plurality of memory units, a first connector that is associated with an accelerated transfer rate, and a second connector that is associated with a non-accelerated transfer rate, performing while the data storage device is operatively coupled to a host device via the first connector or the second connector:
    receiving a transfer request; and
    executing a data transfer responsive to the transfer request, wherein executing the data transfer comprises:
       when the transfer request is a write request received via the first connector, writing each of a plurality of received segments to the plurality of memory units, wherein each received segment of the plurality of received segments is uniquely associated with a particular controller of a plurality of first controllers;
       when the transfer request is a write request received via the second connector, segmenting, at a second controller, a received file system into one or more segments and writing the one or more segments to the plurality of memory units; and
       when the transfer request is a read request received via the first connector, reassembling at the plurality of first controllers one or more stored file segments from the plurality of memory units,
    wherein each of the plurality of first controllers is enumerated as a separate storage device when the first connector is connected to the host device.

11. The method of claim 10, further comprising:
    receiving a connection signal at the plurality of first controllers responsive to a connection of the storage device to the host device via the first connector; and
    receiving the connection signal at the second controller responsive to a connection of the storage device to the host device via the second connector.

* * * * *